United States Patent [19]

Colonel et al.

[11] Patent Number: 4,957,788
[45] Date of Patent: Sep. 18, 1990

[54] SHOCK RELIEVING PAD

[76] Inventors: Richard C. Colonel, P.O. Box 2192, Renton, Wash. 98056; Devere V. Lindh, 1910 Dogwood Dr., SE., Auburn, Wash. 98002

[21] Appl. No.: 373,240

[22] Filed: Jun. 29, 1989

Related U.S. Application Data

[63] Continuation-in-part of Ser. No. 138,607, Dec. 28, 1987, abandoned.

[51] Int. Cl.⁵ .............................................. F16B 2/00
[52] U.S. Cl. .......................... 428/33; 428/47;
 428/52; 428/119; 428/120; 428/156; 428/166;
 428/167; 428/172; 428/188; 428/223; 52/273;
 52/284; 52/785; 52/593; 5/417
[58] Field of Search ............... 404/35, 41, 37, 38,
 404/34; 403/393, 384; 52/126.5, 589, 386, 593,
 391, 273, 796, 297, 797, 785, 284; 428/44, 53,
 54, 33, 55, 174, 177, 119, 120, 178, 99, 120, 95,
 223, 12, 47, 52, 131, 132, 199, 135, 156, 158,
 159, 166, 167, 188, 192; 2/267; 5/413–420

[56] References Cited

U.S. PATENT DOCUMENTS

| | | | |
|---|---|---|---|
| 3,707,009 | 12/1972 | Wagner | 428/44 |
| 4,167,599 | 9/1979 | Nissinen | 428/44 |
| 4,222,695 | 9/1980 | Sarides | 428/44 |
| 4,505,960 | 3/1985 | Leffingwell | 428/17 |
| 4,533,583 | 8/1985 | May | 428/69 |

FOREIGN PATENT DOCUMENTS 2028233 3/1980 United Kingdom ............... 428/120

Primary Examiner—Henry F. Epstein
Assistant Examiner—Donald J. Loney
Attorney, Agent, or Firm—Robert W. Jenny

[57] ABSTRACT

The subject pad comprises resilient layers attached to each other and spaced apart by compression members distributed with spaces between them. The compression members on one side of each layer are opposite the spaces between the compression members on the other side so that the layer portions between compression members of one layer function as beams loaded near or at their centers by compression members on the adjacent layers. The pad may be an integral part or the layers may be separate, in which case the compression members comprise mating projections from the surfaces of adjacent layers. The compression members may be ridges or colums. The projections may be shaped to mechanically interlock when mated, utilizing the resilience of the material and/or adhesive may be used to secure the attachment.

8 Claims, 2 Drawing Sheets

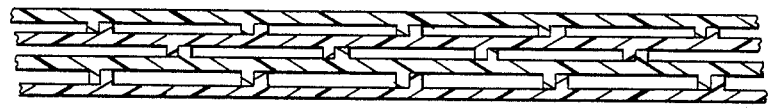
FIG.3
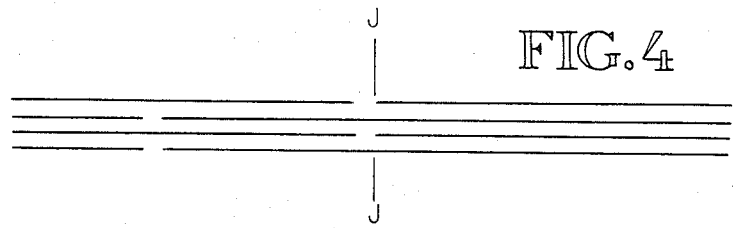
FIG.4
FIG.5
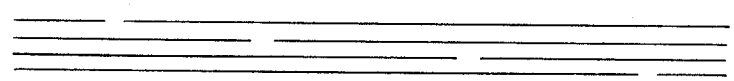
FIG.6
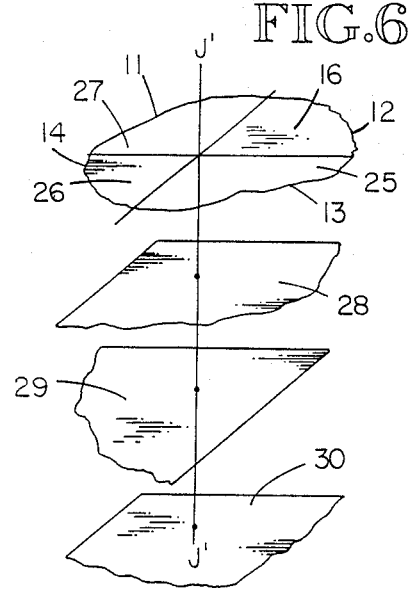
FIG.7
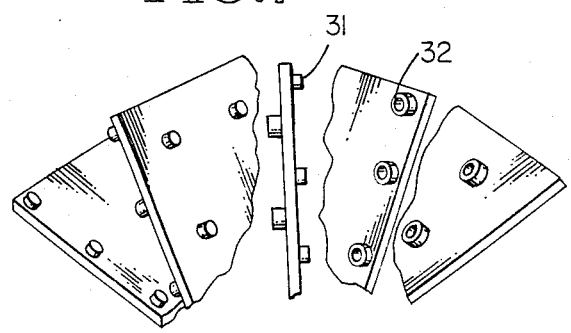
FIG.7A
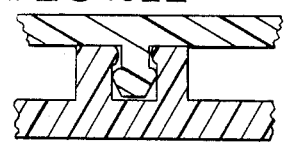
FIG.8
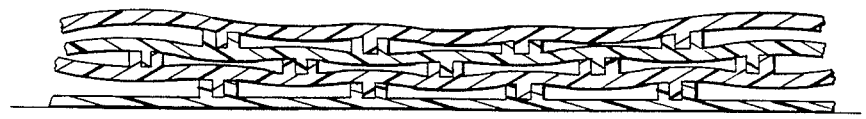

SHOCK RELIEVING PAD

BACKGROUND OF THE INVENTION

This application is a continuation-in-part of application Ser. No. 138,607, filed 12/28/87, now abandoned.

1. Field:

The subject pad is in the field of covering for surfaces which are contacted intentionally or unintentionally by people and specifically in the field of such coverings which are intended to relieve shock loads imposed on people by such contacts. More specifically it is in the field of such coverings used on surfaces provided for athletic activities such as running, wrestling, football, basketball and the like.

2. Prior Art:

Pads in the described field have been in use for many years with varying degrees of success. The patents listed below illustrate examples of various forms of padding, some incorporating features for attaching sections of the padding to each other: U.S. Pat. Nos. 2,680,698; 4,497,858; 4,287,693; 4,509,510; 4,533,583; British No. 4873 (1895).

U.S. Pat. No. 4,130,452, British Patent No. 565,723 and French Patent No. 2,421,057 illustrate structural forms considered usable in aerobic padding. Prior art for some structural aspects of the subject invention may also be found in U.S. Pat. Nos. 4,765,412 and 4,789,009 issued to one or more of the subject inventors.

Pads and padding of various kinds are commercially available in large sheets, such as the padding used under carpets. The prior art also includes the padding used under heavy machines and the like to attenuate vibratory and shock loads transmitted from the machines and the like to supporting structure.

Relatively recent increases in scholastic and professional athletic interest and participation have increased the need for and importance of pads used with athletic activities. In particular the use of artificial turf installed over paved or other hard surfaces has made it vitally necessary to provide improved padding for the intended purpose of limiting injuries caused by contact with the turf to levels roughly equivalent to those experienced with natural turf, i.e. grass.

It is desirable virtually to the point of necessity that the pad absorb a minimum of the energy it stores and relieves each time it is deflected. In other words, the pad should be highly elastic. It is well known that absorption of the contact energy associated with foot contacts is fatiguing to the user. For example, damp sand such as on a beach provides good shock relief for a runner's feet but absorbs all of the shock energy and the fatigue involved is readily apparent. The situation is even more apparent on dry sand. The fatigue adversely affects the performance of athletes and, more seriously, the incidence of injuries in games like football is known to increase significantly with player fatigue.

Another desired characteristic of such padding, aside from the shock relief, is that it be stable laterally while providing resilience vertically, this being a characteristic of natural turf. Lateral stability in this instance means that the upper, "wear" surface of the pad moves very little, if at all, in the directions parallel to the surface and such stability is essential to the optimum performance of users, particularly in activities involving rapid footwork, such as football, basketball, boxing and raquetball. It is also desirable that such padding be very durable, partly because the installation costs may be a substantial part of the total costs of using the pad. Further, it is desirable that the pad be readily applicable to areas such as baseball and football fields.

Accordingly, a primary objective of the subject invention is provision of a shock relieving pad having shock relief capabilities equal to or better than those of natural turf. Further objectives are that the pad be highly elastic, durable, and applicable to areas as required for baseball and football and have high lateral stability.

SUMMARY OF THE INVENTION

The subject invention is a pad for use under artificial turf, such as that having the trademarked name Astroturf. In one embodiment of the invention the pad is to be laid over a smooth, flat, hard surface and comprises a plurality of layers. The top and bottom layers are flat on one side and have projections on the other with open spaces between the projections. Intermediate layers have projections on both sides, the projections having spaces between them with the projections on one side of each layer being opposite the spaces between projections on the other. The projections are such that those on one layer fit into those on adjacent layers so that the adjacent layers are prevented from moving laterally with respect to each other. In one embodiment the projections on one facing side are short columns and the projections on the other facing side are rings which the columns fit into for engagement. In another embodiment the projection are ridges, with a single ridge on one facing side fitting between dual ridges on the facing side of an adjacent layer. In an alternate embodiment there are single ridges on both facing sides and the layers are assembled with the ridges of each layer laying alongside the ridges of adjacent layers and held in place with adhesive. For convenience in terminology, the columns and single ridges are termed male projections and the circles and dual ridges are termed female projections. In a preferred embodiment all the intermediate layers are identical, having male projections on one side and female on the other, the projections on one side being opposite the midpoints of the spaces between projections on the other. The top layer is smooth on its exposed side and has appropriate projections on the other side for engaging the adjacent layer. The bottom layer may also be flat on its exposed side with appropriate projections on the other; however, projections on its exposed side can be useful.

In a preferred embodiment the pad comprises top and bottom layers smooth on both sides and at least one intermediate layer with projections on both sides.

Also, the male and female projections may have crossectional shapes such that male and female projections "snap" together; i.e. the female project must expand and contract elastically to engage the male projection.

With a plurality of layers as described, the pad comprises layers separated by compression members formed by the engaged projections. The layer portions between the compression members function as beams and, when a load is applied to the top surface, the beams deflect to store energy and then release the energy as the load is removed.

The material used in the pads is highly elastic, such as acetal plastics, and releases a large portion of energy stored at each deflection. Any energy not released is absorbed. A technique for demonstrating and measuring the elasticity is to drop a sphere made of material much stiffer than the pad, such as steel, onto the pad from a height H and measuring the rebound height H'. The subject pad is such that H' is more than 80% of H. In other words what is termed, for purposes of this disclosure, the elasticity ratio H'/H of the material is 0.8 or more. A ratio of 0.6 or more is considered satisfactory.

When more than one pad is required to cover an area, more than one pad is used and the pads must be joined such that there are minimal effective discontinuities in the function of the pads at the joints. To achieve such joining the layers of adjoining pads are interleaved and the engagements of the projections serve to secure the pads together. With this configuration the only functional effect at the junctures of the pads is that some of the effective beams are not continuous and therefore carry no load. This effect is minimized by varying the amount of interleaving overlays of the layers.

The functional characteristics of the pad depend on the material characteristics, the number of layers used, the thicknesses of the layers, the heights of the projections and the nature and distribution of and spacing between projections. Accordingly, a wide spectrum of load capabilities versus spring rates of the pads is made possible and these characteristics can be made different in various portions of the pad if desired.

The subject pad is described in more detail below with reference to the attached drawings.

BRIEF DESCRIPTION OF THE DRAWINGS

FIG. 3 is a sectional view which illustrates alternate basic structure of the pad.

FIG. 4 illustrates schematically one arrangement of pad layers at the juncture of two pads.

FIG. 5 illustrates schematically another arrangement of pad layers at the juncture of two pads.

FIG. 6 illustrates the interleaving of pad layers at the common juncture of four pads.

FIG. 7 illustrates an alternate form of compression members, comprising columns and encircling of ridges.

FIG. 7A is an enlarged sectional view of the compression members of FIG. 7, shown engaged.

FIG. 8 is a sectional view illustrating the function of the pad.

DETAILED DESCRIPTION OF THE INVENTION

Figure 1:
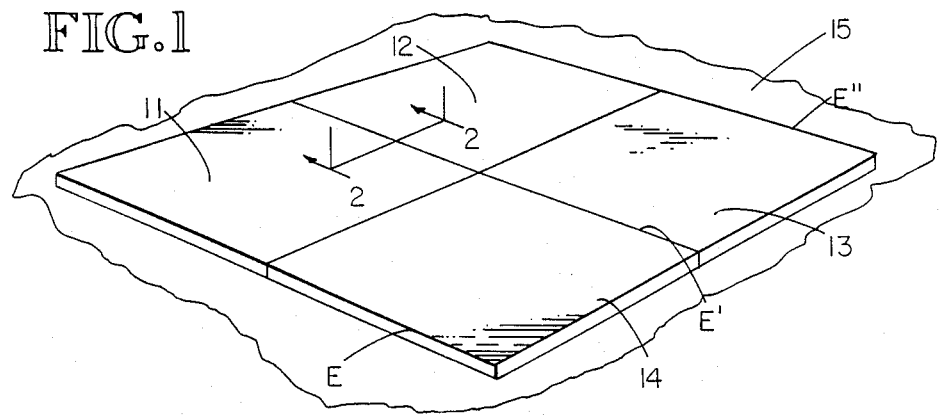
FIG. 1 is a perspective view of four of the subject pads joined to cover an area.
Figure 2:
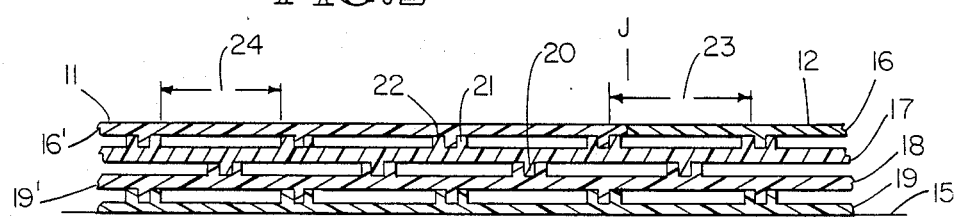
FIG. 2 is a sectional view taken at 2—2 in FIG. 1 and illustrates basic structure of the pad and the structure at the joint between two pads.
Figure 2A:
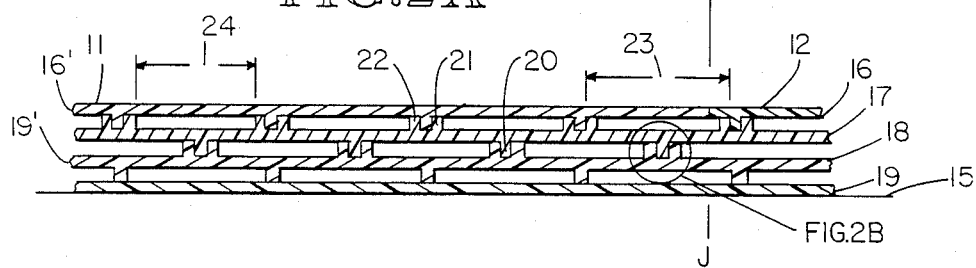
FIG. 2A is a sectional view of an embodiment of the invention in which the top and bottom layers are smooth on both sides.
Figure 2B:
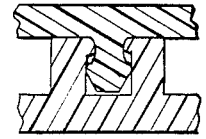
FIG. 2B is an enlarged view of the circled area of FIG. 2, showing an embodiment of ridge type compression members in cooperative engagement and mechanically locking one layer to an adjacent layer.

FIG. 1 shows pads 11, 12, 13 and 14 joined to cover an area of surface 15. FIG. 2 is a sectional view taken at 2—2 in FIG. 1 to illustrate the structure of the pads and the structural details of a joint between pads 11 and 12. The structure of pad 12 is typical of one embodiment of all the pads and comprises a stack of layers 16, 17, 18 and 19, layer 16 being the top layer, layer 19 the bottom layer and identical layers 17 and 18 being intermediate layers. An intermediate layer such as layer 17 has projections on one side, projection 20 being typical, and pairs of projections on the other, pair 21 and 22 being typical. Projections 20 have spaces such as space 23 between them and projections 21 and 21, a typical pair, are also spaced apart, space 24 being typical. The projections 20 on one side of the layer are located opposite the centers of the spaces between the projections 21 and 22 on the other side. In this embodiment the projections are ridges positioned across the layers of the pad. Projections 20, 21 and 22 are of equal height. Projections 20 fit snugly in cooperative engagement with projections 21 and 22 of each pair, so that when one layer is laid over another projections 20 on one layer can engage the grooves formed between projections 21 and 22 on the opposing face of the adjacent layer. When two or more layers are stacked, the engaged projections form compression members between adjacent layers and the layer portions between the compression members become beams. The projections may be shaped to mechanically interlock, facilitated by the resilience of the material. Layer 16 in this embodiment has projections only on its lower side. Layer 19 has projections only on its upper side in this embodiment; however there could be projections on its lower side and the layer portions between those projections would function as beams so that the bottom layer would be active in the function of the pad. In the embodiment shown the flat lower surface of the bottom layer is attached by adhesive to the surface 15.

In the pad embodiment shown in FIG. 3 each of the intermediate layers has individual, spaced apart ridge projections on both sides and the top and bottom layers have projections only on their sides which face the intermediate layers. The layers are positioned so that the ridges between each two layers are in side-by-side contact and the ridges are held in such engagement by adhesive to form the compression members.

At the juncture of pads 11 and 12, indicated by J—J in FIG. 2, layer 17 in pad 12 extends across the juncture to interleave with layers 16' and 19' in pad 10. Similarly layer 19 of pad 12 extends across the juncture into pad 11. The engagements of the projections of the layer portions which cross the juncture secure the pads in close and necessary proximity. FIG. 4 schematically illustrates this arrangement of interleaved layers at the juncture of two pads. FIG. 5 illustrates another arrangement.

FIG. 6, an exploded schematic view of the juncture of the corners of pads 11, 12, 13 and 14, illustrates the interleaving of layers at such a juncture. The corners of the top layers 16, 25, 26, 27 meet at juncture line J'—J'. Layer 28 of pad 13 extends beyond the juncture into pads 14, 11 and 12. Layer 29 of pad 14 extends into pads 11, 12 5 and 13. Layer 30 of pad 13 also extends into pads 14, 11 and 12. Again, the engagements of the projections of all the layer segments involved help secure the four pads in the needed close proximity at the corners.

Some or all of the engagements of the projections may be augmented by adhesives.

In the embodiments described the projections are ridges extending from edge to edge of the layers, such as from edge E to edge E' of panel 14 and edge E' to edge E" of panel 13 in FIG. 1. In another embodiment the members comprise columns projecting from the surface of one layer engaging encircling ridges projecting from the facing surface of the adjacent layer, the two surfaces being opposing faces. In FIG. 7, the columns 32 are cylindrical and the encircling ridges 32 are correspondingly circular.

FIG. 7A is a crossectional view of compression members 31 and 32 in cooperative engagement as in an assembly of the pads. Projection 31 is enlarged at its end 33 in the form of a ridge 34 of essentially semicircular crossection. The cavity 35 in projection 32 is enlarged near the bottom of the cavity. When projection 31 is forced into projection 32, projection 32 must expand to allow passage of ridge 34 and then contracts to hold projection 31 inserted into projection 32, mechanically locking together the two projections and the layers from which they extend.

FIG. 8 is similar to FIG. 2 except that the pads are shown deflected by a load such as that applied by the pressure of the ball of a person's foot. The deflection is near the maximum since the gaps between the affected effective beams are almost zero. The pads are designed such that maximum deflections are limited by interlayer contacts and such that the stresses in the material used under maximum deflection are less than the allowable maximum repeated stress capability of the material. The layer materials are resilient and accordingly the pads are resilient and function as springs. The spring characteristics are determined by many factors, including the number of layers, the thicknesses of the layers (not necessarily all the same), the heights of the projections and the spacings and orientations of the projections and the compression members they form.

The material used in the pads is highly elastic, such as acetal plastics, and releases a large portion of energy stored at each deflection. Any energy not released is absorbed. A technique for demonstrating and measuring the elasticity is to drop a sphere made of material much stiffer than the pad, such as steel, onto the pad from a height H and measuring the rebound height H'. The subject pad is such that H' is more than 80% of H. In other words what is termed, for purposes of this disclosure, the elasticity ratio H'/H of the material is 0.8 or more. A ratio of 0.6 or more is considered satisfactory.

A requirement for pads of the subject type is that they provide good lateral stability. In this instance lateral stability is provided when the working surface of the pad, the surface contacted by the users or supporting the surface (such as Astroturf$^{(R)}$) used by the users moves minimally in directions parallel to the surface under loads applied in such directions by the users. The subject pad provides the required lateral stability. It will be recognized and understood by those skilled in the art that the structural design of the pad makes it much stiffer in resisting lateral displacement of the working surface than it is in resisting vertical displacement of the surface to relieve shocks caused by contacts having vertical components in the motions of the contacts.

It is considered clearly understandable from the above description that the invention meets its objectives. A shock relieving pad is provided having features which enable provision of shock relieving capabilities equal to or better than those of natural turf. It is better in terms of reducing injuries stemming from fatigue because the pad is more elastic than turf, i.e. it absorbs less of the energy involved in contacts. The features, combined with material selection, make the pad durable. It can be manufactured in large sizes and the pads can be effectively attached to each other so that areas the size of baseball and football fields can be covered. Also, the design features provide the desired lateral stability.

It will further be understood by those skilled in the art that while preferred embodiments of the invention are described herein, other embodiments and modifications of those described are possible within the scope of the invention which is limited only by the attached claim.

We claim:
1. A pad comprising:
    a plurality of layers of resilient material,
    a plurality of compression members,
    said layers being interconnected and spaced apart by said compression members,
    whereby said layers are combined into a stack of said layers, said stack having:
        first and second outside layers and
        at least one intermediate layer,
    said layers having first and second sides and projections extending from at least one of said first and second sides of said outside layers and from said first and second sides of said at least one intermediate layer,
    said projections being shaped and positioned such that cooperative engagement of said projections on adjacent layers comprises said compression members and such that said compression members have spaces between them and said compression members on said first side of said at least one intermediate layer are opposite said spaces on said second side of said at least one intermediate layer.

2. The pad of claim 1 having a plurality of intermediate layers having first and second sides with said compression members on said first sides of said intermediate layers being opposite said spaces on said second sides of said intermediate layers.

3. The pad of claim 1 in which said layers have first and second edges and said projections are ridges positioned across said sides from said first to said second edges.

4. The pad of claim 2 in which said layers have first and second edges and said projections are ridges positioned across said sides from said first to said second edges.

5. The pad of claim 1 in which said layers are held spaced apart from adjacent layers such that first of said first and second sides of one layer faces a second of said first and second sides of one of said adjacent layers whereby said first and second sides comprise first and second opposing faces and
    said compression members comprise cylindrical columns extending from said first opposing face and circular ridges extending from said second opposing face.

6. The pad of claim 3 in which said ridges are positioned relative to each other and have crossectional shapes such that said cooperative engagement mechanically locks said ridges to each other whereby said layers are locked into position relative to each other in said stack.

7. The pad of claim 4 in which said ridges are positioned relative to each other and have crossectional shapes such that said cooperative engagement mechanically locks said ridges to each other whereby said layers are locked into position relative to each other in said stack.

8. The pad of claim 5 in which said cylindrical columns and said circular ridges are positioned relative to each other and have crossectional shapes such that said cooperative engagement mechanically locks said columns to said ridges, whereby said layers are locked into position relative to each other in said stock.

* * * * *